(12) United States Patent
James

(10) Patent No.: US 11,200,019 B2
(45) Date of Patent: Dec. 14, 2021

(54) BYPASSING DESKTOP COMPOSITION

(71) Applicant: DISPLAYLINK (UK) LIMITED, Cambridge (GB)

(72) Inventor: Paul James, Thurlby (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 16/620,454

(22) PCT Filed: Jun. 8, 2018

(86) PCT No.: PCT/GB2018/051568
§ 371 (c)(1),
(2) Date: Dec. 6, 2019

(87) PCT Pub. No.: WO2018/224842
PCT Pub. Date: Dec. 13, 2018

(65) Prior Publication Data
US 2020/0183635 A1 Jun. 11, 2020

(30) Foreign Application Priority Data
Jun. 9, 2017 (GB) ..................... 1709232

(51) Int. Cl.
*G06F 3/14* (2006.01)
*G09G 5/00* (2006.01)
(52) U.S. Cl.
CPC .......... *G06F 3/1454* (2013.01); *G06F 3/1423* (2013.01); *G09G 5/006* (2013.01); *G09G 2370/02* (2013.01)

(58) Field of Classification Search
CPC .................. G06F 3/1454; G09G 5/14
See application file for complete search history.

(56) References Cited

U.S. PATENT DOCUMENTS

| 7,176,848 | B1* | 2/2007 | Dai | G06F 3/1438 |
| | | | | 345/2.2 |
| 10,348,867 | B1* | 7/2019 | Gemignani, Jr. | H04L 69/30 |
| 2002/0154214 | A1* | 10/2002 | Scallie | G02B 27/017 |
| | | | | 348/51 |
| 2005/0088452 | A1* | 4/2005 | Hanggie | G06F 9/451 |
| | | | | 345/581 |
| 2006/0222246 | A1 | 10/2006 | Murai et al. | |
| 2007/0203682 | A1 | 8/2007 | Gummalla et al. | |

(Continued)

FOREIGN PATENT DOCUMENTS

| EP | 1475731 | 11/2004 |
| GB | 2502082 | 11/2013 |
| GB | 2536253 | 9/2016 |

*Primary Examiner* — Kevin M Nguyen
(74) *Attorney, Agent, or Firm* — Paradice & Li LLP

(57) ABSTRACT

A computer system is disclosed comprising an operating system having a display subsystem. The display subsystem includes a display interface for receiving display information from applications, and is adapted to generate display output based on the display information. A redirection module is configured to intercept calls from an application to the display interface. Responsive to the intercepted calls, the redirection module transmits display output generated by the application to a connected display device, bypassing at least part of the display subsystem, including for example a desktop compositor or window manager.

20 Claims, 5 Drawing Sheets

(56) References Cited

U.S. PATENT DOCUMENTS

| | | |
|---|---|---|
| 2007/0222955 A1 | 9/2007 | Kubota |
| 2011/0078532 A1 | 3/2011 | Vonog et al. |
| 2014/0351833 A1* | 11/2014 | Teng .................. G06F 9/545 |
| | | 719/328 |
| 2016/0373772 A1 | 12/2016 | Ellis et al. |

* cited by examiner

BYPASSING DESKTOP COMPOSITION

CROSS-REFERENCE TO RELATED APPLICATIONS

This application is a U.S. national stage application under 35 U.S.C. § 371 of International Patent Application No. PCT/GB2018/051568, filed on Jun. 8, 2018, which claims the benefit of Great Britain Patent Application No. 1709232.1 filed on Jun. 9, 2017, the contents of each of which are incorporated herein by reference in their entirety.

BACKGROUND

Conventionally, in desktop operating systems, display data is sent through a desktop compositor, which generates a single image for display and passes it to a display driver. This introduces significant delay and requires data to be copied repeatedly to different parts of memory. It also impacts timing as such drivers must often use the hardware clock associated with the attached display device. This means that the timing is highly inflexible.

The invention aims to solve or at least mitigate these problems.

SUMMARY

Accordingly, in a first aspect of the invention, there is provided a computer system comprising: an operating system having a display subsystem, the display subsystem comprising a display interface for receiving display information from applications, the display subsystem adapted to generate display output based on the display information; and a redirection module configured to: intercept calls from an application to the display interface; and responsive to the intercepted calls, transmit display output generated by the application to a connected display device, bypassing at least part of the display subsystem.

By bypassing parts of the display subsystem, display latency can be reduced and increased display refresh rates can be achieved.

The operating system and redirection module are preferably in the form of software code stored on one or more computer readable media, executable by one or more processors of the computer system.

The redirection module is preferably adapted to bypass the display interface. Alternatively or additionally, the redirection module may be adapted to bypass a window manager and/or compositor component of the display subsystem. By bypassing a desktop compositor or similar component, additional copy operations typically performed by such components can be avoided, thereby improving processing efficiency.

The redirection module is preferably adapted to provide display output to a display driver, the display driver configured to transmit the display output to the connected display device. The redirection module may be adapted to provide the display output directly to the display driver associated with the connected display, without involvement of the display subsystem of the operating system (thereby bypassing the display subsystem). The display driver may be separate from any display driver also provided in the system for use with the display subsystem.

The term "intercept" as used herein preferably refers to receiving information output by an application that is intended by the application (or the application's designers) for receipt by another component, such as the display subsystem/display interface. Thus, the redirection module preferably operates transparently, not requiring awareness or adaptation of the application and/or the display subsystem.

The terms "display information", "display data" and "display output" as used herein may refer to any type of information used as the basis for generating actual display output on a display, and includes display instructions/commands, display parameters (e.g. configuration parameters such as parameters setting display modes etc.), and graphical content data such as pixel data, mesh data, texture data, other 3D scene data, vector graphics data etc.

Preferably, the redirection module is adapted to intercept a call referencing a display buffer, and to cause data from the display buffer to be output to the connected display device. The data may be written to the display buffer by the application, either directly or in some other way, or may be written to the display buffer by the redirection module (responsive to intercepted calls). Data may also be written to the buffer via other calls to the display interface that are handled by the display interface and not the redirection module. The intercepted call may comprise a call to initiate an update to a display based on an image buffer, such as a "present" call or the like.

The redirection module preferably implements at least a part of a display API provided by the display interface (e.g. a set of one, some or all functions/operations defined in the display interface). The redirection module may be adapted to pass some calls on to the display interface whilst handling others itself. In an embodiment, the redirection module comprises an API shim for the display interface. The redirection module may comprise a library adapted to intercept calls to an operating system library associated with the display subsystem, preferably wherein the library and operating system library are dynamic link libraries, DLLs.

The redirection module may be arranged to run in one or both of: user space, and kernel space of the operating system. In a particular embodiment, the redirection module comprises a first component adapted to run in user space and interface with the application and/or a user-mode part of the display subsystem, and a second component adapted to run in kernel space and interface with a kernel-mode part of the display subsystem of the operating system. The first and second components are preferably arranged to cooperate to acquire display information output by the application and generate output on the connected display device based on the acquired display information.

In an embodiment, the connected display device is connected over a general-purpose data transmission medium, and/or wherein the display driver comprises or is associated with a wrapper component for enabling transmission of a display signal via a general-purpose data transmission medium. The term "general-purpose data transmission medium" preferably refers to a transmission medium that is not intended/designed mainly or only for visual or audio-visual data, but rather that is designed to support transmission of data irrespective of the type or content of the data. The general-purpose data transmission medium may comprise a USB connection. Thus, the connected display device may be connected over a Universal Serial Bus (USB) connection, and/or the display driver may comprise or be associated with a USB wrapper component for enabling transmission of a display signal via a USB connection.

The display driver may comprise an Indirect Display Driver (IDD).

The system may further be connectable to a second display device, the system arranged to provide output to the second display device via the display subsystem and/or display interface, without redirection by the redirection module.

In that case, the redirection module is preferably configured to redirect display output from the application and not to redirect display output associated with one or more other applications. Thus the redirection module may operate selectively on display output for one or more selected applications from a plurality of applications running on the system. Output from other applications may be sent to the second display system using the standard display subsystem of the operating system, including the display interface, window manager and/or desktop compositor.

The system may be adapted to update display output provided to the connected display device at a first refresh rate and to update display output provided to the second display device at a second refresh rate different from the first refresh rate. The first refresh rate may be higher than the second refresh rate. Preferably, the first refresh rate is independent of a synchronization signal (e.g. a vertical synchronization signal or other hardware synchronization signal) used to synchronize updates to the second display device and/or is based on a software clock associated with the display driver for the connected display device.

Preferably, output to the second display device occurs via one or more of: the display interface; a window manager and/or desktop compositor associated with the operating system; and a graphics driver associated with a graphics controller of the system, the graphics driver preferably a Windows Display Driver Model, WDDM, driver.

The output to the second display device may comprise an operating system desktop image (preferably composited by a window manager/desktop compositor) comprising one or more windows associated with one or more applications.

The system preferably further comprises the application, the application adapted to generate display output for supply to the display interface, the application preferably not specifically adapted to use (and preferably unaware of) the redirection module.

The output to the connected display device may comprise output only from the application, preferably in non-windowed and/or full-screen mode.

The redirection module is preferably arranged to update a display at the connected display device in dependence on a rate at which the application provides updated display information to the redirection module (and preferably independently of a display update rate of the window manager/desktop compositor).

The display interface may comprise a Direct3D and/or DirectX interface. The operating system may be a Microsoft Windows operating system.

The connected display device may comprise a virtual reality or augmented reality display device or headset. Thus, the display output provided to the display device may comprise display information for multiple displays.

Any of the display devices discussed herein may be integral to the computer system, or may be separate and connected to the computer system via any suitable wired or wireless connection media.

In a further aspect of the invention (which may be combined with any of the other aspects set out herein), there is provided a method of generating display output on a display device connected to a computer device, the method comprising, at a redirection module: intercepting calls from an application running on the computer device, the calls intended for a display interface provided by an operating system of the computer device; and responsive to the intercepted calls, transmitting display output generated by the application to the connected display device; wherein the transmitting step bypasses at least part of a display subsystem of the operating system.

The bypassing step preferably refers to transmitting display output without involvement of at least part of the display subsystem, e.g. output being transmitted directly to a graphics driver for the connected display device. The transmitting step may bypass one or more of: a display interface or display API, a window manager, and a desktop compositor of the operating system.

The transmitting step may comprise transmitting the display output via a USB connection or other general-purpose data transmission medium to the connected display device.

The method may comprise running a plurality of applications on the computing device, and generating, by the redirection module, a display output on the connected display device for a single one of the plurality of applications, preferably as a full-screen display. The method may comprise generating a windowed desktop display including display windows for one or more other ones of the plurality of applications on a second display, the generating preferably performed by the display subsystem of the operating system without redirection of display data by the redirection module.

The method may comprise installing and/or loading the redirection module, preferably as a library implementing an API shim for a display library of the operating system.

The method according to this aspect may comprise performing the further steps or activities as carried out by the computer system defined above in relation to the first aspect of the invention.

In a further aspect of the invention (which may be combined with any of the other aspects defined herein), there is provided a display redirection module for use in a computer system having a display subsystem, the display subsystem comprising a display interface for receiving display information from applications, and adapted to generate display output based on the display information; the display redirection module configured to: intercept calls from an application to the display interface; and responsive to the intercepted calls, transmit display output generated by the application to a connected display device, bypassing at least part of the display subsystem. The display redirection module may comprise the further features of the redirection module in the system as set out above and/or may be adapted to perform a method as defined above. The display redirection module may be in the form of software code on a computer-readable medium for execution by a computer system.

In a further aspect, the invention provides a computer readable medium comprising software code adapted, when executed on a data processing apparatus, to perform any method as set out herein and/or to provide a system and/or redirection module as set out herein.

The invention extends to a system having means, preferably in the form of a processor with associated memory, for performing any method as set out herein.

Embodiments of the invention provide a method of bypassing desktop image composition by selectively redirecting the source of a display driver to copy display data directly from the application that produced it, bypassing the operating system's desktop windows manager, desktop compositor, or similar component.

This method may involve a process that copies the data directly in user space, or may be embodied by two such processes which access buffers created by the graphics card handlers in user- and kernel-mode. Both methods create an interface between the initial rendering of the display data and the display driver. This not only removes the requirement to copy data in and out of memory several times, but also means that the display driver is not controlled by the desktop compositor and associated clock. The display can therefore potentially be refreshed as fast as data can be produced, with very little latency, without affecting the behaviour of other displays.

DETAILED DESCRIPTION OF THE DRAWINGS

Figure 1:
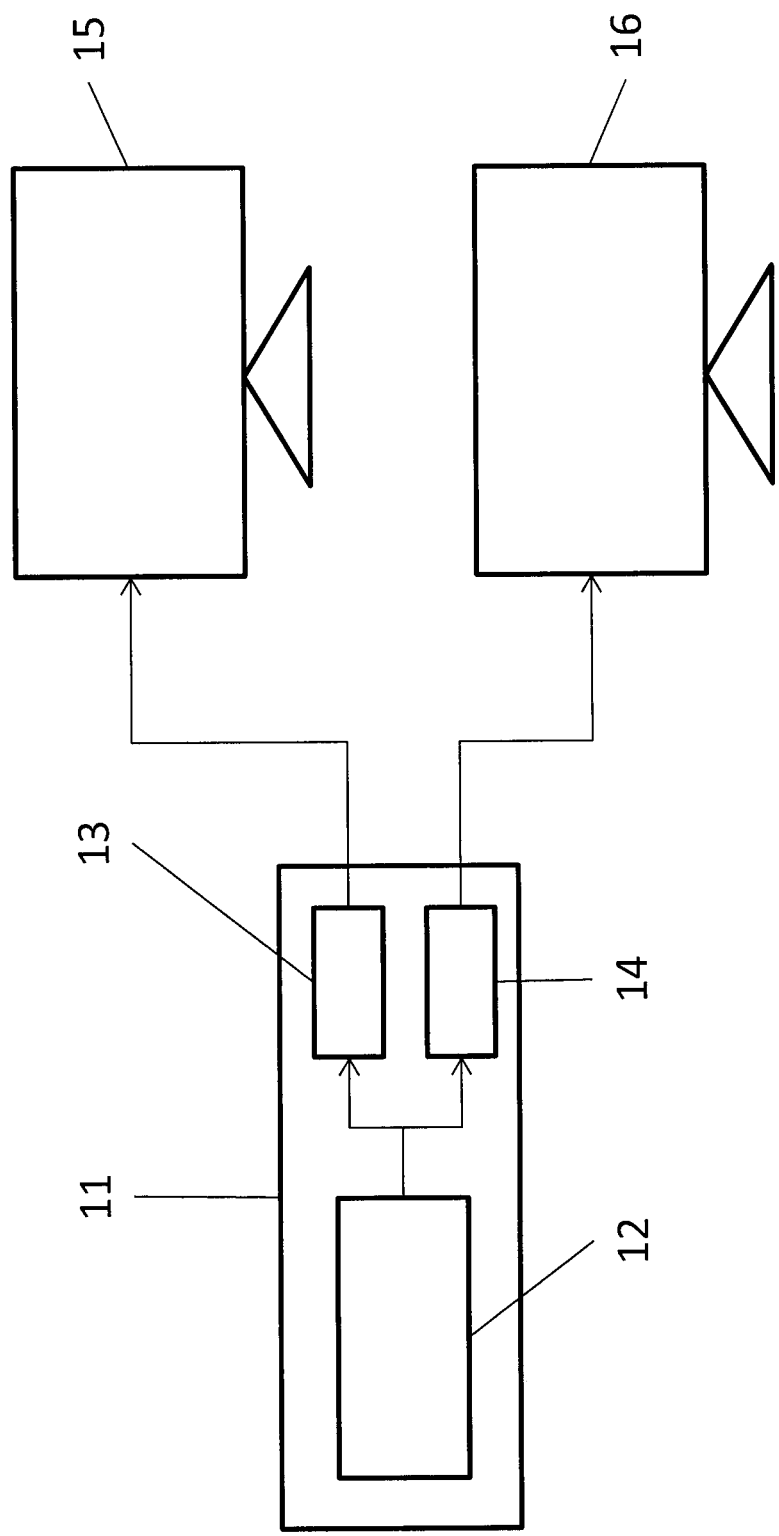
FIG. 1 shows an overview of a display system.

FIG. 1 shows a host [11] containing a GPU [12] and two drivers [13, 14], each controlling a display device [15, 16]. The GPU [12] is connected to both drivers [13, 14] in order to supply them with display data to forward to the display devices [15, 16]. In this example, the two display devices [15, 16] are controlled using slightly different systems. The first display device [15] is controlled using a conventional display driver [13], which is controlled by a windowing manager as described in FIG. 2. The second display device [16] is controlled using a redirection module and display driver [14] arranged according to the invention.

In one embodiment, the first display [15] is connected via a conventional display connection (e.g. HDMI, DVI or VGA) while the second display [16] is connected via a USB connection (with the graphics driver [14] comprising, or associated with, a USB wrapper component to allow transport of display data over USB). The connection between host [11] and display [16] may further include a USB adapter (not shown), e.g. attached to the display [16], such that the display itself is connected to the USB adapter using a conventional display connection (e.g. HDMI), with the USB adapter converting the signal as needed. However, the USB adapter may not be needed, e.g. where equivalent functionality is integrated into display [16] or display [16] is natively arranged to support reception of display signals via a USB connection. Note that connection types are given by way of example and other connections may be substituted. For example, the second display device [16] could be connected via another general-purpose data transport mechanism (such as IEEE 1394, Thunderbolt, wireless connections and the like), or could alternatively also be connected by a conventional display connection (e.g. HDMI, DVI or VGA).

Figure 2:
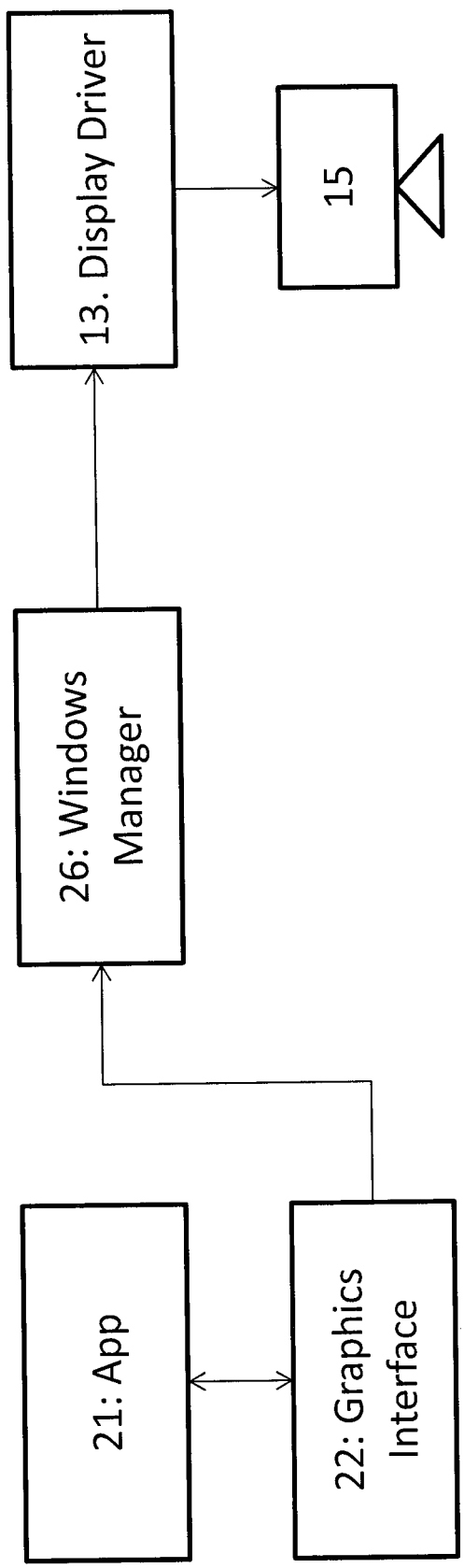
FIG. 2 shows the current display pipeline.

FIG. 2 shows a block diagram of a conventional display pipeline such as that used for the first display device [15] described in FIG. 1.

The left-most column shows the processes and modules used in generating display data. At the top, the application [21] produces display data. It is directly connected to a graphics interface [22], which interacts with other parts of the pipeline. In particular, the graphics interface [22] is connected to and interacts with the windowing manager [26].

The middle column shows the windowing manager [26], which is responsible for composition of frames of display data. It receives data generated by the application [21] and, most likely, multiple other applications. Often, this display data is in the form of "windows" and their locations in a desktop environment. The windows manager [26] then creates complete frames for display.

The windowing manager [26] is connected to the driver [13] associated with the display device [15] and transmits the finished frame to it. The driver [13] then forwards the frame to the display device [15].

Figure 3:
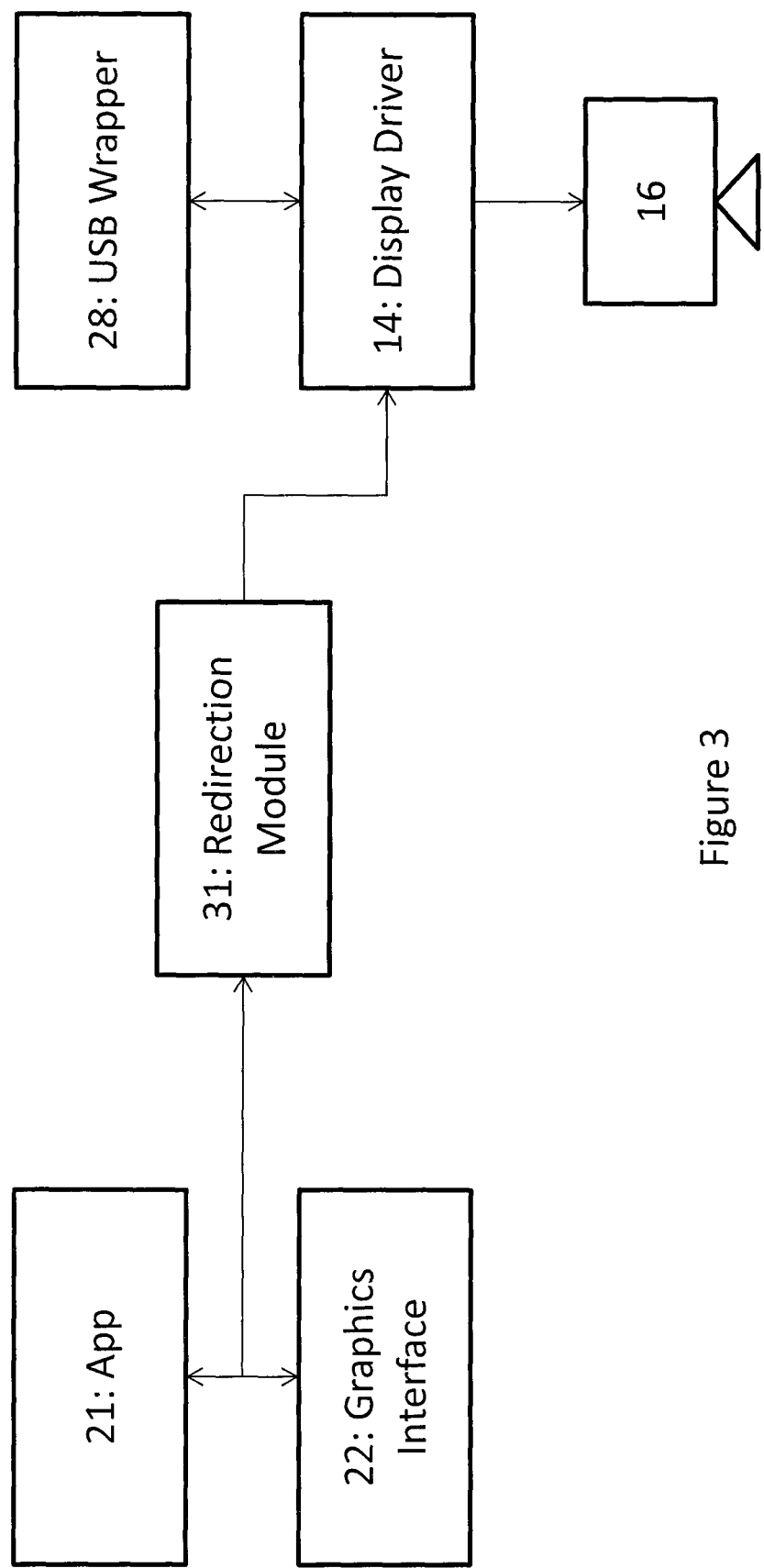
FIG. 3 shows a first embodiment of the system with a user-mode redirection module process.

FIG. 3 shows a similar system, but this system is arranged according to a first embodiment of the invention. Since in this system the windows manager [26] is bypassed, it is not shown here. The removal of this branch of the system provides an immediate saving in terms of processing power and memory bandwidth, and accordingly means that the display data can be transported from the application [21] to the display device [16] much more quickly.

The display data sent to the driver [14] via the redirection module [31] could be a full-screen image or could be an application window as normally understood, and it will be the only image displayed on the display device [16]. It can also be passed as a handle or memory address rather than actual display data, to minimise copying.

The display data is copied from the application buffer directly to the display driver [14] via a redirection module process [31] which is connected to both. The application [21] may not be aware that the display data is being received by a redirection module [31]; if the application [21] has a suitable external interface, display data may be copied by either a windows manager or other operating system process, as in the embodiment described in FIG. 2, or by a redirection module [31] intercepting data that would otherwise be sent to an operating system process or the graphics interface. The operating system may likewise be unaware of the presence of the redirection module [31]; it is aware that there is an application [21] present, but not that it is sending any display data for display.

In this embodiment, the redirection module [31] process runs in user space, so it interfaces with the application [21] and the driver [14] only. This could be carried out either by a copy between two pieces of memory or by using a shared piece of memory. For example, the redirection module process [31] may consist of making an image buffer (e.g. in the form of a surface) created by the application [21] available to the driver [14] and instructing the driver [14] to read from that buffer. No USB wrapper [28] is required for the display data, but it loads the driver and allows it to interact with the display device [16] via a display control device (such as the USB adapter mentioned above, if provided), which is not here shown.

Figure 4:
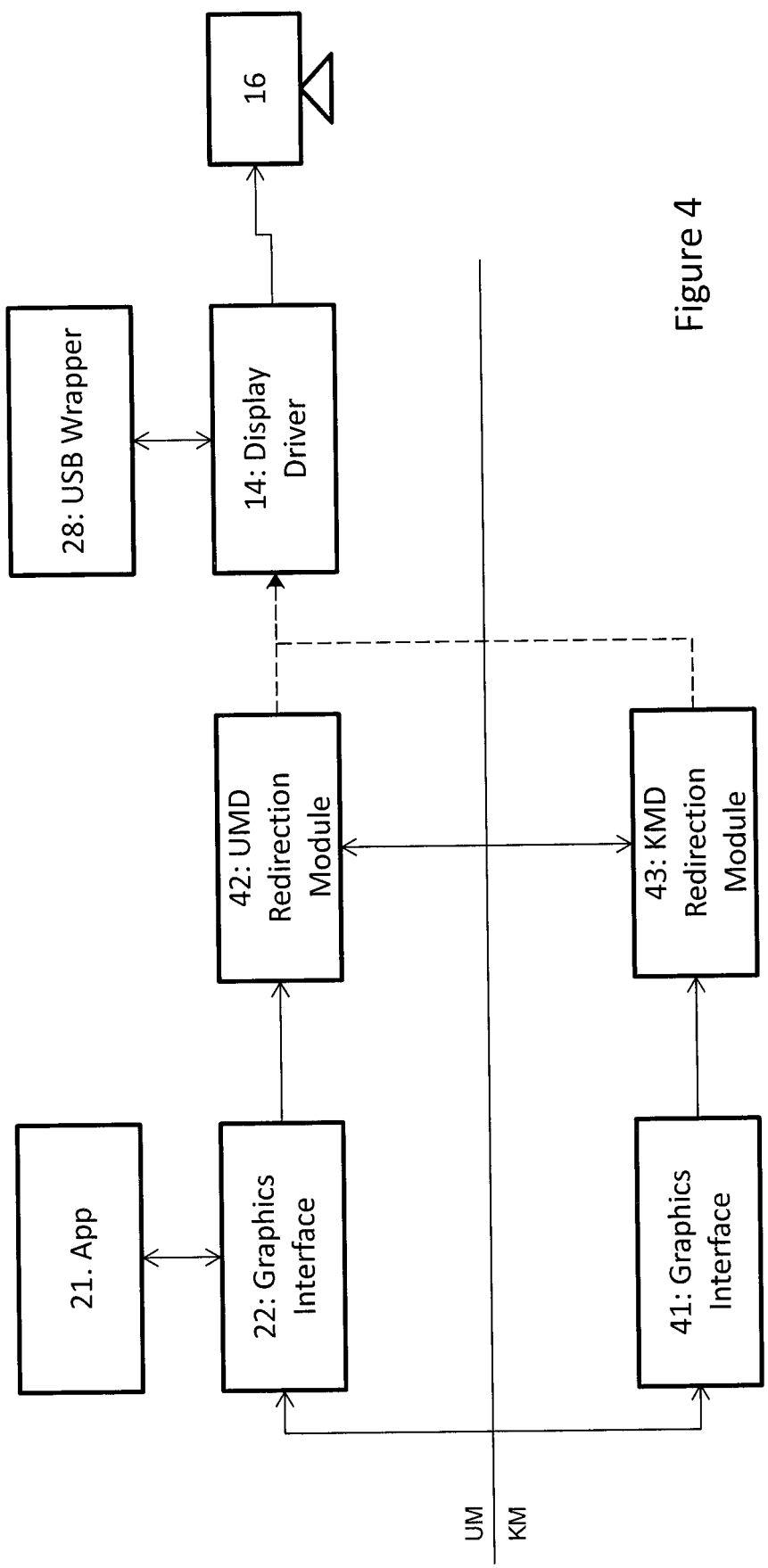
FIG. 4 shows a second embodiment of the system with two redirection module processes.

FIG. 4 shows a second system arranged according to an embodiment of the invention. As previously mentioned for FIG. 3, the windows manager [26] is not shown, since it is bypassed by the two redirection module processes [42, 43]. In this embodiment, there is a redirection module process [42] in the user space, which is connected to the user-mode aspect of the graphics interface [22, 41]. There is also a second redirection module process [43] which runs in kernel mode. This is connected to a kernel-mode graphics interface [41] and exchanges data with the user-mode redirection module process [42]. The two redirection modules [42, 43] work together to receive significant information and display data from the two parts of the graphics interface [22, 41] and pass data between themselves to send a complete frame to the display driver [14]. Either one of them can then pass the frame to the display driver [14]. As such, the connections between the redirection modules [42, 43] and the display driver [14] are shown with dashed lines in the Figure.

As with the embodiment shown in FIG. 3, the application [21] and operating system may not be aware that the display data is being received by a redirection module [42, 43]. Furthermore, the USB wrapper [28] may not be required, depending on how the driver [14] interfaces with the operating system, as previously mentioned.

This embodiment is useful when the redirection modules [42, 43] must be incorporated after the display data has been passed to the graphics interface [22, 41], since the embodiment in FIG. 3 involves intercepting data between the application [21] and the graphics interface [22]. The embodiment in FIG. 3 is likely to be easier to implement due to the different interfaces required, but depending on the interfaces available in the application [21] it may be impossible and the embodiment in FIG. 4 may be more useful.

Both embodiments shown in FIGS. 3 and 4 can operate alongside the system shown in FIG. 2; the use of the redirection modules [31, 41, 42] does not interfere with the windows manager [26], they merely bypass it. Thus, (referring back to FIG. 2), the operating system window manager [26] and desktop compositor may continue to render desktop and window content for other applications to form a complete rendered desktop image for display on conventionally connected display [15], whilst the USB connected display [16] may display (full-screen) output from one specific application only, with the output in that case transmitted using the redirection module [31, 42, 43] and bypassing the window manager [26]. This decoupling from the normal rendering path involving the window manager also means that the driver [14] operates independently of any clock controlling the windows manager [26]. As a result, the display device [16] could be refreshed as quickly as the application [21] produces data.

Figure 5:
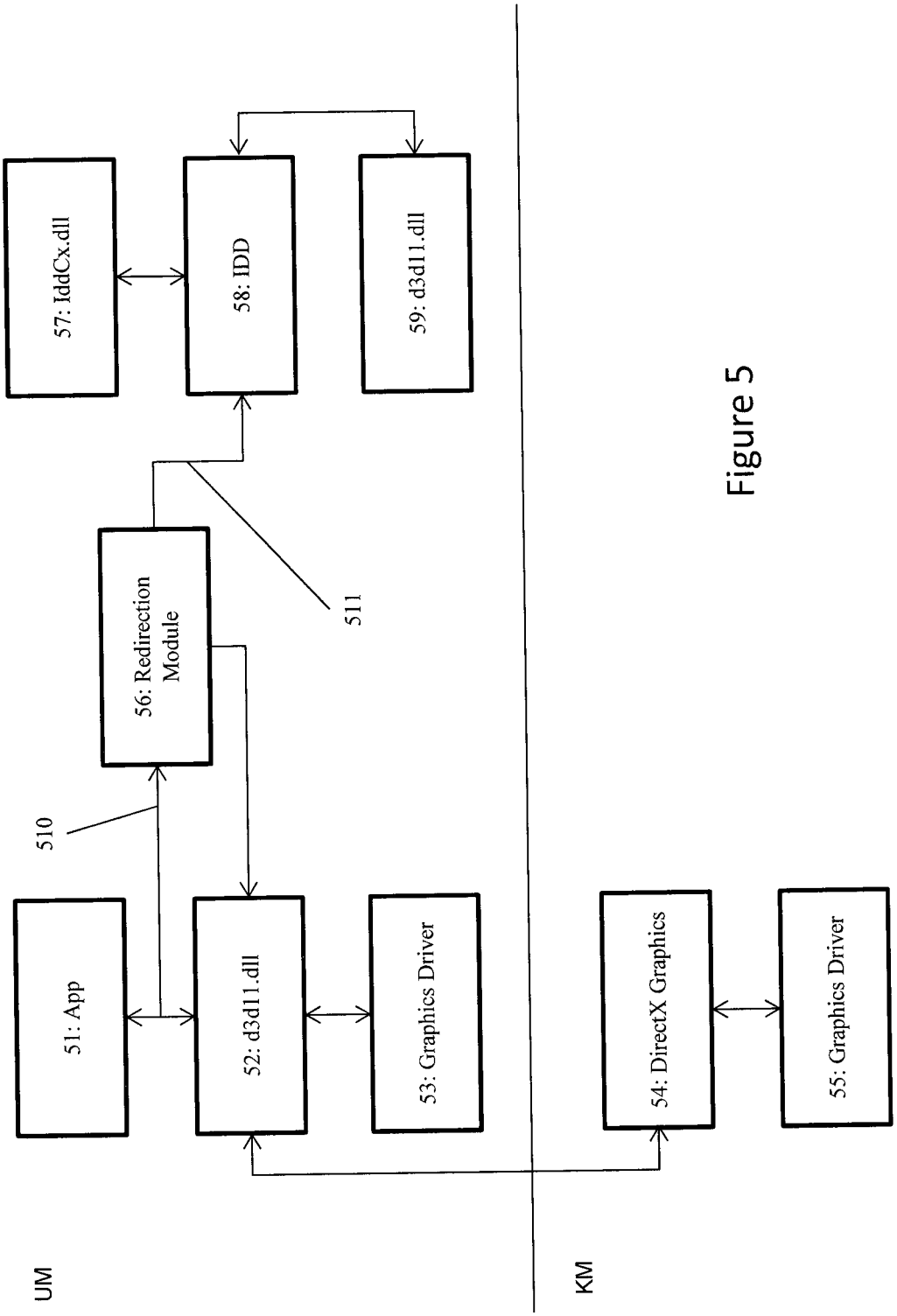
FIG. 5 shows a detailed embodiment of the system in a Microsoft Windows environment.

FIG. 5 shows a more detailed example of the embodiment shown in FIG. 3, described as specific to a Microsoft Windows environment. Conventionally, the display data would be routed through the Desktop Windows Manager, but since this is omitted it is not shown in FIG. 5.

In this example, the application [51] is a video player which is playing a video on external display panel [16]. As previously mentioned, it is the only application producing display data to be shown on the external display panel [16] (though other content may continue to be displayed on display [15] if being used). It is connected to the Direct 3D runtime libraries [52], which include the Direct3D API in the form of dynamic link library (DLL) "d3dll.dll". This is in turn connected to the DirectX Graphics Kernel [54] and the user mode graphics driver component [53]. The DirectX Graphics Kernel [54] is in turn connected to a second, kernel mode graphics driver component [55] in the Kernel part of the operating system. User-mode and kernel mode components [53] and [55] are components of the WDDM driver, typically provided by the GPU manufacturer. These modules [52, 53, 54, 55] communicate with one another through the appropriate connections, allowing the application [51] ultimately to send instructions to the graphics card regarding generation of display data.

The IDD driver [59] is responsible for the provision of display signals to the alternate display [16], e.g. over a USB connection (using a USB wrapper) as described previously, and implements the IDD driver model as opposed to WDDM. The IDD driver is connected to another iteration [59] of the processes from the Direct 3D runtime libraries as well as the USB wrapper, represented by DLL "IddCx.dll" [57], via libraries provided by the Windows operating system.

The IDD driver [58] is also connected to a user-space redirection module [56] as previously described. The redirection module [56] implements an API [510] provided by the Direct 3D runtime library [52]. This allows it to copy display data from the application to a shareable surface in memory associated with the redirection module [56]. This shareable surface can be accessed by the IDD driver [58]. As a result, the window manager/desktop compositor is bypassed, avoiding significant additional copying of data, the redirection module [56] instead sending instructions [511] to the IDD driver [58] to fetch data from the shareable surface associated with the redirection module [56], which was populated directly by the application [51].

In an embodiment, the redirection module [56] operates as a shim for the Direct3D API [52] and thus intercepts calls to the API transparently. The redirection module may be configured to process only certain API calls, while others are passed on to the actual underlying Direct3D API [52]. For example, the application may use graphical operations of the Direct3D API [52] to create image data in an image buffer (which are passed through to the Direct3D API [52] by the redirection module [56]), with the redirection module [56] subsequently intercepting and handling an instruction for updating a display based on the image buffer (e.g. a "present" API call).

The redirection module [56] may also pass particular API calls to the actual Direct3D API [52] but process the same API calls itself as well, e.g. in order to generate the same output via the conventionally connected display [15] and the USB-connected display [16] (in one example, the content of a particular window displayed as part of a desktop on display [15] could be shown in full-screen mode on display [16], in the latter case bypassing the OS window manager/desktop compositor).

While the above example is in the context of a Windows-based personal computer, the claimed invention can be implemented in any appropriate operating system environment, to bypass parts of the graphics subsystem of an operating system, such as window managers and desktop compositors. Examples include Mac OS and UNIX/Linux-based operating systems.

Conventional graphics architectures (e.g. based on the WDDM driver model, with displays connected to graphics cards or chipsets via DVI, HDMI, VGA or other dedicated display connections) generally rely on hardware synchronization signals, in particular Vsync signals, to control display updates, constraining display update rates in the system. Furthermore, where multiple displays are connected, display update rates are typically limited to the slowest of the displays. The IDD driver model used in present embodiments instead uses a software clock which is not tied to Vsync signals. In the example of FIG. 1, this allows updates to the display [16] (connected via USB and using the IDD driver as described above) to proceed independently from updates to conventionally connected display [15] via the OS window manager and WDDM driver (in the Windows example). Furthermore, since the redirection module [57] receives data directly from the application bypassing the OS window manager, display updates can occur as fast as the application is able to supply data (regardless of any display concurrently generated on display [15]).

In one specific example, the conventionally connected display [15] is an ordinary display, showing e.g. a desktop with windows, composited by a window manager/desktop compositor in the operating system, whilst the second display is a virtual reality (VR) headset comprising a dual display for creating a 3D display effect. The described architecture allows a VR application to provide a VR experience using the headset with greater refresh rate and lower display latency, whilst allowing normal access to and interaction with operating system functions on the conventionally connected display [15]. The second display device could alternatively be in the form of an augmented reality display.

Whilst in these examples the display connected according to embodiments of the invention coexists with a conventionally connected display (e.g. display [15] shown in FIG. 1), other examples may omit the conventionally connected display altogether. For example, a system may include just a single display, or multiple displays, connected according to the described embodiments.

Although particular embodiments have been described in detail above, it will be appreciated that various changes, modifications and improvements can be made by a person skilled in the art without departing from the scope of the present invention as defined in the claims. For example, hardware aspects may be implemented as software where appropriate and vice versa, and modules which are described as separate may be combined into single modules and vice versa. Functionality of the modules may be embodied in one or more hardware processing device(s) e.g. processors and/or in one or more software modules, or in any appropriate combination of hardware devices and software modules. Furthermore, software instructions to implement the described methods may be provided on a computer readable medium.

LIST OF ABBREVIATIONS

3D Three-dimensional
API Application Programming Interface
DLL Dynamic Link Library
DVI Digital Visual Interface
GPU Graphics Processing Unit
HDMI High-Definition Multimedia Interface
IDD Indirect Display Driver
IEEE Institute of Electrical and Electronics Engineers
OS Operating System
USB Universal Serial Bus
VGA Video Graphics Array
VR Virtual Reality
Vsync Vertical synchronization
WDDM Windows Display Driver Model

The invention claimed is:

1. A computer system comprising:
an operating system having a display subsystem, the display subsystem comprising a display interface for receiving display information from a plurality of applications currently executing on the computer system, and adapted to generate a display output based on the display information corresponding to each of the plurality of applications; and
a redirection module comprising code executable by the computer system and configured to:
select a first application from the plurality of applications currently executing on the computer system;
intercept calls from the selected first application while display information from other applications of the plurality of applications continues to be displayed by the display interface; and
responsive to the intercepted calls, transmit display information generated by the selected first application to a connected display device, the display information generated by the selected first application bypassing at least part of the display subsystem.

2. The system according to claim 1, wherein the redirection module is further configured to bypass at least one of: the display interface; a window manager of the display subsystem; or a compositor component of the display subsystem.

3. The system according to claim 1, wherein the redirection module is further configured to provide the display output to a display driver, the display driver configured to transmit the display output to the connected display device.

4. The system according to claim 1, wherein the redirection module is further configured to intercept a call referencing a display buffer, and to cause data from the display buffer to be output to the connected display device.

5. The system according to claim 1, wherein the redirection module implements at least a part of a display Application Programming Interface (API) provided by the display interface, the redirection module comprising an API shim for the display interface.

6. The system according to claim 1, wherein the redirection module comprises a library adapted to intercept calls to an operating system library associated with the display subsystem, wherein the library and the operating system library are dynamic link libraries (DLLs).

7. The system according to claim 1, wherein the redirection module is arranged to run in one or both of: a user space or a kernel space of the operating system.

8. The system according to claim 1, wherein the redirection module comprises a first component adapted to run in a user space and interface with the first application and/or a user-mode part of the display subsystem, and a second component adapted to run in a kernel space and interface with a kernel-mode part of the display subsystem of the operating system, wherein the first and second components are arranged to cooperate to acquire display information output by the first application and generate an output on the connected display device based on the acquired display information.

9. The system according to claim 1, wherein the connected display device is connected over a general-purpose data transmission medium comprising a Universal Serial Bus (USB) connection, and/or wherein the connected display device comprises or is associated with a wrapper component for enabling transmission of a display signal via the general-purpose data transmission medium.

10. The system according to claim 1,
wherein the system is further connectable to a second display device, the system arranged to provide output to the second display device via the display subsystem and/or the display interface, without redirection by the redirection module; and
wherein the redirection module is further configured to redirect the display information generated by the selected first application to the connected display device while display information generated by at least one other application of the plurality of applications is outputted to the second display device via the display subsystem and/or the display interface.

11. The system according to claim 10, wherein the display information generated by the selected first application renders as a display output in the connected display device at a first refresh rate; and wherein the display information generated by the at least one other application renders as a display output in the second display device at a second refresh rate that is different from the first refresh rate, wherein the first refresh rate is at least one of:

higher than the second refresh rate;

independent of a synchronization signal used to synchronize updates to the second display device; or based on a software clock associated with a display driver for the connected display device.

12. The system according to claim 10, wherein output to the second display device occurs via one or more of: the display interface; a window manager and/or desktop compositor associated with the operating system; or a graphics driver associated with a graphics controller of the system, the graphics driver comprising a Windows Display Driver Model (WDDM) driver.

13. The system according to claim 10, wherein the output to the second display device comprises an operating system desktop image composited by a window manager/desktop compositor comprising one or more windows associated with one or more applications.

14. The system according to claim 1, further comprising the first application, wherein the first application is adapted to generate the display information for supply to the display interface, and wherein the application is not specifically adapted to use the redirection module.

15. The system according to claim 1, wherein the display information transmitted to the connected display device comprises output only from the first application of the plurality of applications, in a non-windowed and/or a full-screen mode.

16. The system according to claim 1, wherein the redirection module is further configured to update a display at the connected display device based on a rate at which the first application provides updated display information to the redirection module.

17. The system according to claim 1, wherein the connected display device comprises a virtual reality display device or headset or an augmented reality display device or headset.

18. A method of generating display output on a display device connected to a computer device, the method comprising, at a redirection module:

selecting a first application from a plurality of application currently running on the computer device;

intercepting calls from the selected application while display information from other applications of the plurality of applications running on the computer device continues to be displayed by a display interface provided by an operating system of the computer device; and responsive to the intercepted calls, transmitting display information generated by the selected application to the connected display device; and wherein the transmitting the display information bypasses the display interface of the operating system.

19. The method according to claim 18, comprising installing and/or loading the redirection module, as a library implementing an API shim for a display library of the operating system.

20. A computer readable medium comprising software code adapted, when executed on a data processing apparatus, to provide a display redirection module for use in a computer system having a display subsystem;

wherein the display subsystem comprises a display interface for receiving display information from a plurality of applications currently executing in the computer system, and is adapted to generate a display output based on the display information; and wherein the display redirection module is configured to:

select a first application from the plurality of applications currently executing on the computer system;

intercept calls from the selected application while display information from other applications of the plurality of applications executing in the computer system continues to be displayed by the display interface; and responsive to the intercepted calls, transmit display information generated by the selected application to a connected display device, bypassing at least part of the display subsystem.

* * * * *